United States Patent [19]

Wendling

[11] Patent Number: 4,800,843
[45] Date of Patent: Jan. 31, 1989

[54] ANIMAL TETHER

[76] Inventor: Jack Wendling, RR 9, South Eighth St., Quincy, Ill. 62301

[21] Appl. No.: 57,768

[22] Filed: Jun. 3, 1987

[51] Int. Cl.⁴ .......................... A01K 1/04; A01K 3/00
[52] U.S. Cl. ...................................... 119/117; 119/121
[58] Field of Search ................ 119/96, 109, 116, 117, 119/124, 121; 273/184 B, 196, 197 R, 26 E, 200 B

[56] References Cited

U.S. PATENT DOCUMENTS

| | | | |
|---|---|---|---|
| 824,182 | 6/1906 | Knoff | 119/121 |
| 2,435,081 | 1/1948 | Howard | 119/121 |
| 2,551,540 | 5/1951 | Johnson | 119/121 |
| 2,607,320 | 8/1952 | Ashbaugh | 119/121 |
| 4,185,424 | 1/1980 | Streit | 119/121 |
| 4,491,091 | 1/1985 | Satterfield | 119/117 |

FOREIGN PATENT DOCUMENTS 281064 12/1927 United Kingdom ................ 273/196

Primary Examiner—Paul J. Hirsch
Attorney, Agent, or Firm—Joseph W. Holloway

[57] ABSTRACT

A tethering device having plural ground-penetrating legs which are laterally spaced along the major portion of their lengths and are joined at their aboveground ends for supporting a ball bearing swivel assembly. Segments of the plural legs penetrate a centerbore through the inner race of the bearing assembly as well as a pair of protective cover plates between which the bearing assembly is sandwiched. The upper terminal end surfaces of the legs are exposed for receiving impact forces required to drive the legs into the ground.

4 Claims, 1 Drawing Sheet

U.S. Patent    Jan. 31, 1989    4,800,843
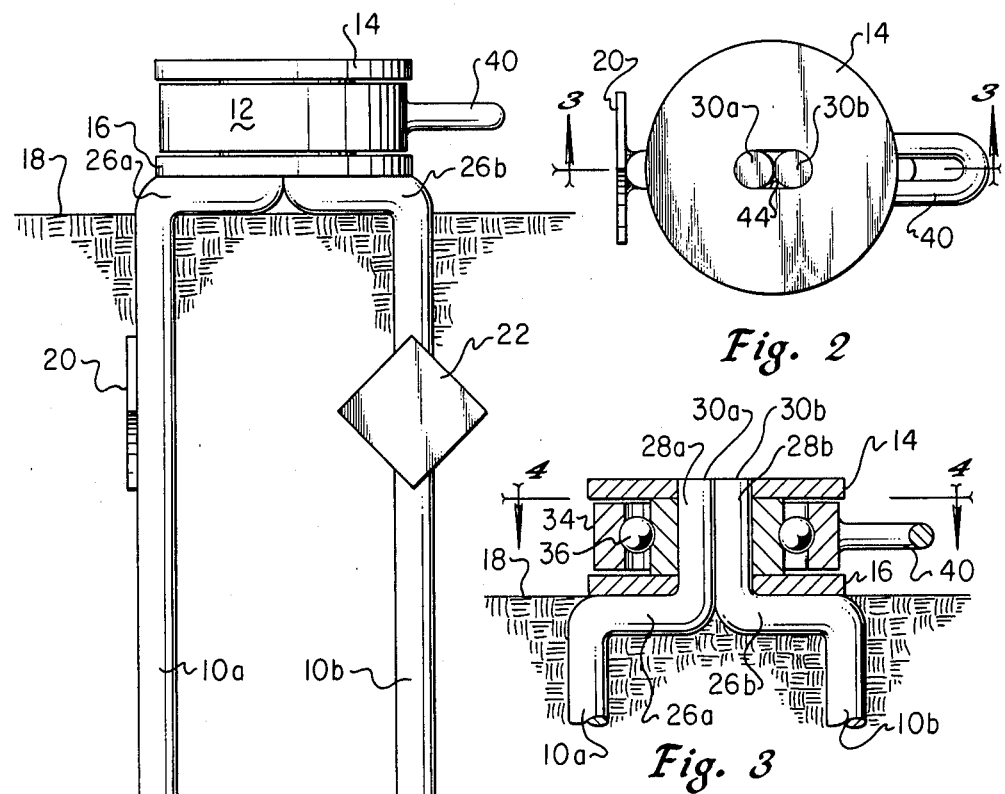
Fig. 1
Fig. 2
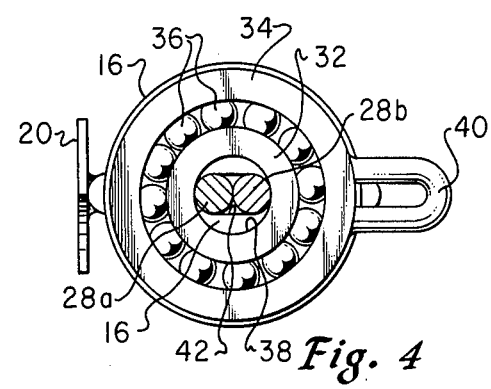
Fig. 3
Fig. 4
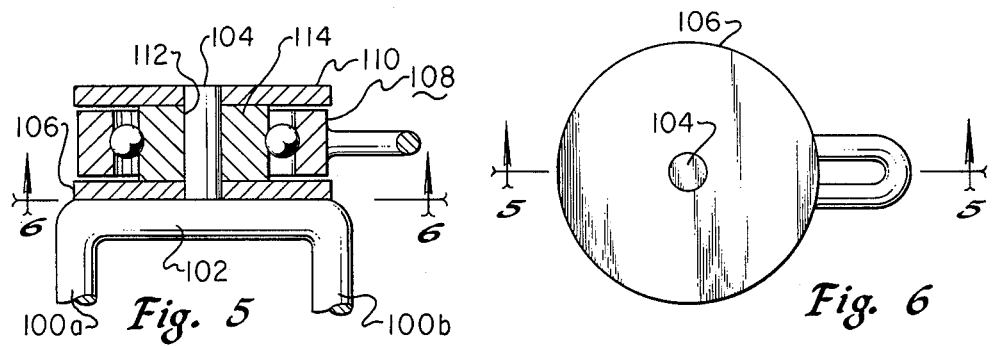
Fig. 5
Fig. 6

ANIMAL TETHER

BACKGROUND OF THE INVENTION

This invention generally pertains to animal tethering devices and more particularly to improved means for anchoring such devices securely to the ground. The need for a tether exhibiting improved ground-holding characteristics is a long-standing one particularly in the cases of tethering large dogs or livestock or where the ground is sandy, wet or very friable.

Tethering stakes having a swiveled component to which an animal is attached by a chain or rope are well-known. Also known in the art of animal tethers are various ancillary structural assemblies which cooperate with the tether's main ground stake to provide added stability and enhanced ground-holding power.

U.S. Pat. No. 824,182 to Knoff teaches the use of an ancillary plate having curved prongs threadably attached to the upper shank portion of a central ground stake.

U.S. Pat. No. 2,812,743 to Dustin shows a central stake penetrating an ancillary plate having downturned ground engaging corners with apertures therethrough to receive discrete anchor pins which are driven angularly into the ground after the central stake is set.

U.S. Pat. No. 4,620,506 to Stubbs discloses an ancillary bed member having ground-penetrating legs and an aperture through which a central stake is driven. A collar affixed to the shank of the central stake coacts with a complementary recess in the bed to absorb lateral strain placed on the stake.

U.S. Pat. No. 4,491,091 to Satterfield exhibits an ancillary base plate having apertures for receiving a plurality of discrete stakes which are driven therethrough into the ground. A detachable swivel member is then assembled on an upstanding standard situated on the base plate.

A common structural feature of the aforedescribed tethering devices is a separate plate-like member to which are attached a plurality of ground-penetrating pins, blades, stakes or other such anchoring means in order to provide more ground-holding power than that provided by a single main stake. The prior art tethers suggested by Dustin and Satterfield require a plurality of discrete pins for securing the anchor plate to the ground; and, Stubbs requires that the legs of his bed be pounded into the ground before a central stake is likewise driven into the ground and assembled with the bed. Each of these devices require that their multiple parts be driven into the ground or assembled in several time consuming steps. With each of these multiple-part tethers there ia also a risk that component parts may be misplaced incidentally to moving from place to place.

The Knoff, Dustin and Stubbs tethers exhibit another structural drawback common to most devices intended for this purpose in that the main stake is not well suited to withstand the pounding required to drive it into the ground. All such prior art devices carry some sort of swivel structure at the impact receiving end of the stake; and, unless care is taken during impacting, the swivel components can be battered or broken thereby disabling the swivel. The Satterfield tether avoids this problem since it does not employ a main ground stake, but relies entirely on four discrete pins penetrating its platform to hold it in place.

It is also a common practice to utilize a conventional ball bearing assembly as a swivel component for animal tethers. U.S. Pat. No. 1,456,627 to Delbridge and U.S. Pat. No. 2,551,540 to Johnson show swivel plates rotatably mounted on tether stakes by means of antifriction bearing assemblies. The aforenoted Satterfield tether also utilizes a ball bearing swivel member. In none of these tethers is adequate provision made to protect the swivel's bearing components from misdirected impact blows; nor, is the bearing shielded from potentially damaging forces imparted to the swivel components as an incident to being inadvertently overrun by wheeled vehicles or being trod upon by a horse or other heavy animal attached to the tether. Moreover, the extensive aboveground projections of the Delbridge, Johnson, and Satterfield tethers are conducive to damage to the tether and damage or injury to any vehicle or animal which may accidentally impact the tether.

Another problem encountered in the use of typical prior art tethers having a single elongated ground stake is the difficulty in extracting the stake from the ground without bending the stake or damaging the swivel device customarily attached the top end of the stake. This problem is exacerbated in the case of the aforedescribed tethers having special means to provide extraordinary anchoring ability.

SUMMARY OF THE INVENTION

Accordingly, it is the general object of this invention to provide an improved animal tether which obviates the afore-described shortcomings of the prior art devices presently utilized for this purpose.

A principal object is to provide a swivel type tether suitable for livestock as well as domestic pets which exhibits improved anchoring ability yet requires no manual assembly of ancillary parts such as anchor plates or pins. To this end, this invention contemplates plural ground stakes or legs which are laterally spaced along the major portions of their length but are structurally joined at their above-ground ends in an advantageous manner formounting a bearing type swivel thereon. Segments of plural legs are received within and penetrate a centerbore through the inner race of the bearing assembly. The legs also penetrate a pair of protective cover plates between which the bearing assembly is sandwiched.

A related object is to utilize plural elongated legs in combination with a bearing assembly ruggedly mounted thereon whereby the coterminal upper end surfaces of the legs penetrate the bearing assembly and are exposed for receiving blows necessary to force the legs into the ground.

Another object is to mount upon the upper portion of the legs of the improved tether a pair of sturdy plates for protecting the easily damaged outer race and the balls of the bearing assembly. Both such plates are centrally mounted on vertical portions of the plural legs with the lower plate affixed to horizontally bent portions of the legs. The upper plate is affixed about the upper ends of the legs in vertically spaced relation to the lower plate with the inner race of the bearing assembly nonrotatably fixed between the plates. A driving blow misapplied to the upper plate instead of the intended end faces of the legs which penetrate the upper plate will nevertheless be transmitted to the legs via the rugged bearing inner race and the lower plate without damage to the outer race and balls. Likewise, the weight of any large animal that may tread on the upper plate will be isolated from the rotating components of the bearing assembly.

Still another object is realized by utilizing the horizontally bent portions of the plural legs which underly the aforementioned lower plate of the swivel assembly as a pry point for withdrawing the tether legs from the ground. While great force may be applied directly to the legs to achieve withdrawal, the swivel components are effectively isolated from such prying or lifting forces.

Yet another object is to provide an improved tether productive of the aforedescribed advantages yet being more ruggedly and compactly constructed than prior art devices incorporating antifriction bearing swivels. Another practical advantage of this invention is its low cost and ease of manufacture due to the use of standard materials and the use of welding as the principal means of assembling the small number of component parts involved.

These and other features and objects of this invention and the manner of attaining them will become apparent and the invention will be best appreciated and fully understood by having reference to the following detailed description of embodiments of the invention taken in conjunction with the accompanying drawings.

BRIEF DESCRIPTION OF THE DRAWINGS

FIG. 1 is an elevational view of the tether constructed in accordance with this invention illustrating the tether secured to the ground;

FIG. 2 is a top plan view of the tether shown in FIG. 1;

FIG. 3 is a partial sectional view taken along lines 3—3 of FIG. 2;

FIG. 4 is a sectional view taken along lines 4—4 of FIG. 3;

FIG. 5 is a partial sectional view of an alternate configuaration of the invention taken along lines 5—5 of FIG. 6; and, FIG. 6 is a bottom view of the tether shown in FIG. 5.

DETAILED DESCRIPTION OF THE PREFERRED EMBODIMENT 0F THE INVENTION

Referring to FIG. 1 of the drawings, the tether generally comprises identical elongated metal rods or legs 10a and 10b and an antifriction swivel assembly, denoted in its entirety by numeral 12, which is attached to the aboveground portion of legs 10a and 10b and is captured between upper and lower plates 14 and 16, respectively.

The legs 10a, 10b have a substantial length to cross sectional area ratio and are fabricated from rods of sufficient strength and stiffness to be forcibly pounded into the ground to their full lengths. The cross sectional configuration of the rods may vary; however, a round configuration is preferred. The extreme lower ends of the rods are pointed to facilitate ground penetration. Stabilizing plates 20 and 22 are attached to the legs 10a and 10b, respectively, at points along the length of the legs below the ground surface but preferably nearer the upper ends of the legs. The plates 20 and 22 may be of any desired shape and size so long as substantial flat stabilizing surfaces are provided and the plates' resistance to ground penetration is not too great. Since the depicted tether has two legs, the major flat surfaces of the plates 20 and 22 may be advantageously arranged perpendicularly to one another to provide substantial lateral stability in all directions.

For a purpose to be described, the upper portion of each leg 10a and 10b includes two right angle bends which provide horizontal segments 26a and 26b and upturned vertical extensions 28a and 28b, as best shown in FIG. 3. The vertically extending segments 28a and 28b terminate in upper end surfaces 30a and 30b shown in FIG. 2. The length of the belowground portion of each leg can be varied as desired; however, a preferred length is from 12 to 15 inches.

The bearing assembly 12 is a journal bearing of standard construction and operation; and, as best seen in FIGS. 3 and 4, comprises an inner race 32, an outer race 34 and antifriction balls 36 captured in the usual manner intermediate the radially spaced races. The inner race 32 is provided with an axial centerbore 38 and has an axial thickness greater than that of the outer race 34 thereby to provide rotational clearance between the outer race and the facing surfaces of the plates 14 and 16. A U-shaped member 40 is fixed by welding or the like to the outer peripheral wall of the outer race 34 and extends radially from the bearing assembly 12 to receive a clasp or other cooperating means, not shown, secured to the end of a rope or chain attached to an animal to be tethered.

The upturned leg extensions 28a and 28b penetrate an aperture 42 through the lower plate 16, the centerbore 38 of the inner bearing race 32, and an aperture 44 through the upper plate 14. Preferably the diameter of the centerbore 38 is just great enough to receive the leg segments 28a and 28b in touching side-to-side relationship whereby these segments are tightly bundled together. The apertures 42 and 44 are identically sized and are elongated sufficiently to receive and closely surround the legs in the manner shown in FIG. 2.

The lower plate 16 has its flat bottom surface attached in supporting engagement with the underlying horizontal extending segments 26a and 26b of the legs; and, the lower end surface of the inner race 32 is in supported contact with the flat upper surface of the lower plate. The flat lower surface of the upper plate 14 bears on the upper end surface of the inner race 32 so that the inner race is axially captured between the upper and lower plates. FIG. 3 shows that the upper coterminal end surfaces of the legs 10a, 10b register with the upper flat surface of plate 14. In the illustrated embodiments the plates 14 and 16 are of the same diameter which is at least as great as and preferably slightly greater than the outer diameter of the outer bearing race 34. If desired, however, the lower plate diameter may be made larger to provide more surface area for engaging the underlying ground surface 18 in case the horizontal leg segments 26a and 26b are driven into the ground in the manner shown in FIG. 3; and, in such case, the bottom plate will engage the ground surface 18 with substantially its total lower surface.

One advantage of a tether constructed in accordance with this invention is the simplicity of its components and its ease of fabrication. Each leg, 10a for example, is fabricated from standard rod stock by bending the upper portions 26a and 28a as shown and by pointing its lower end by grinding. The stabilizing plates 20 and 22 may be stampings which are welded in place on the legs. The round plates 14 and 16 may be stamped or punched out of steel stock of about 0.25 inch thickness. The bearing assembly 12 is a commercially available item and the member 40 may comprise a partial steel chain link.

The assembly of the above components is achieved entirely by welding. Thus the lower plate 16, after receiving leg portions 28a and 28b through aperture 42, is weldably attached to the upper surfaces of the leg portions 26a and 26b. The bearing assembly 12 is placed on the lower plate 16 with the leg segments 28a and 28b extending upwardly through the centerbore 38 of the inner race 32 in a bundled fashion; and, the upper plate 14 is placed on top of the upper annular surface of the inner race in the position shown in FIG. 3. The upper plate is then welded to the upper ends of the leg segments 28a and 28b by applying weld material between the interior wall of aperture 44 and the portions of the leg segments contained therein. The latter welding step also fills the interior of the centerbore 38 with sufficient weld material to attach the leg segments 28a and 28b to one another and to attach the inner race to these segments thereby preventing axial or rotational displacement of the inner race relative to the legs. Thus by the single simple process of welding, all of the nonrotatable parts of the tether are rigidly and permantly joined in a unitary whole. After the aforedescribed weldments are completed, the upper end surfaces 30a and 30b of the legs and the upper plate surface are ground flat and even to remove any protruding weld material.

An alternate construction which embodies some features of the aforedescribed embodiment of the invention is shown in FIGS. 5 and 6 of the drawings. A pair of depending legs 100a and 100b are intergrally joined by a continuous crossmember 102 to form an inverted U. An upright extension 104 is integrally fixed to crossmember 102 at its midpoint by a weldment. The extension 104 penetrates the lower plate 106, the bearing assembly 108 and the upper plate 110. The centerbore 112 of the inner race 114 of the bearing assembly and the central apertures in the plates 106 and 110 are sized to fit closely about the extension 104; otherwise, the bearing assembly 108 and the plates 106 and 110 are identical to their counterparts shown in FIGS. 1 through 4. The crossmember 102, plates 106 and 110, extension 104 and inner race 114 are rigidly and permanently assembled in the illustrated relationship by a well-known welding process.

The operation of the improved tether heretofore described in detail is as follows: The pointed ends of the legs are positioned on the ground surface 18 at a selected tethering site and are then forced into the ground, in most cases, by impacting the upper plate 14. If the ground is sandy or extremely wet, the legs may be fully inserted into the ground by applying sufficient pressure to the upper plate 14. In either case, the provision of plural ground-engaging legs 10a and 10b substantially increases the holding power of the tether in the ground. The provision of stabilizing plates 20 and 22 provides additional resistance to vertical displacement of the legs since the plates resist lateral deflection of the legs with respect to ground which would otherwise decrease the frictional engagement between the legs and the surrounding ground surface.

An important feature of this invention is realized by exposing the upper end surfaces 30a, 30b of legs 10a, 10b to those impacting blows required to drive the legs into very firm ground. Thus the coterminal end surfaces 30a, 30b register with the upper surface of the top plate 14 and are located in the area where repeated blows are most likely to be delivered. Should, however, a blow miss the surfaces 30a, 30b and impact the upper plate surface at any point thereon, another important advantage of this invention comes into play. The upper plate 14, being made of relatively heavy steel plate and being welded to the leg segments 28a and 28b and bearing inner race 32, performs two important functions. Firstly, the plate 14 entirely overlies and protects the damageable balls 36 and outer race 34 of the bearing assembly 12. Secondly, the force of an errant blow is efficiently transmitted to the horizontal leg segments 26a and 26b due to the rigid interconnection of the upper plate 14 to leg segments 28a and 28b and the interposition of the massive bearing inner race 32 between the plates 14 and 16, the latter plate being rigidly connected to the horizontal segments 26a and 26b. This novel arrangement and coaction of plural tether legs and a component of a bearing assembly mounted thereon protects the bearing assembly from damage and makes possible transmission of impact energy delivered to the upper ends of the legs or to the surrounding upper plate downwardly to the ground-penetrating tips of the legs in an efficient manner. The column 104 of the embodiment shown in FIGS. 5 and 6 coacts with the upper plate 110 to provide substantially the same protective function and efficient energy transmission.

The extent of ground penetration may be limited to that depicted in FIG. 1 if the leg segments 26a and 26b come into bearing contact with very firm ground. Should softer ground conditions be encountered, the leg segments 26a and 26b will enter the ground surface 18; however, further leg penetration will be limited by engagement of the substantial lower plate surface and the ground surface. If extremely soft ground conditions are the norm as in the case of sandy soil, for example, the lower plate 16 may be provided with a larger diameter and surface area than the upper plate 14 to prevent the bearing assembly from becoming buried in the ground should it be trod upon by a heavy animal or be overrun by a vehicle. Even in the ground-engaging position shown in FIG. 1, the tether presents an extremely low and compact profile.

While the provision of two legs for the disclosed tether instead of a single ground stake greatly enhances its anchoring ability, additional legs may be attached to the depicted tether by appropriately enlarging the plate apertures 42 and 44 and the centerbore 38 in the bearing inner race 32 for recieving additional legs identical to legs 10a and 10b. In case very hard ground is normally encountered and driving relatively long legs into such ground is difficult, several shorter legs will provide equivalent ground-holding power.

After the tether is installed, an animal may be attached to the member 40 by any conventional means. Where it is desirable to relocate the tether from place to place as in the cases of grazing livestock or where a pet travels with its owner, any readily available prying means, such as a tire iron or the like, may be inserted under the rugged horizontal leg portions 26a and 26b or the crossmember 102 to draw the legs easily from the ground. Since the tether according to this invention is fabricated as a unitary structure, there are no bothersome ancillary components which require time consuming manual assembly and disassembly or which may become lost or misplaced as an incident to tether relocation.

It will be apparent to those skilled in the art that modifications beyond those described may be made in this invention without departing from its scope and spirit. While the invention has been shown and described in terms of particular parts and arrangements, the invention is not limited thereto except as they are specifically set forth in the appended claims.

What is claimed is:

1. A rotatable animal tether comprising:

a plurality of laterally spaced ground-penetrating legs having substantial length to cross sectional area ratios;

said legs having aboveground portions including horizontally bent segments and vertically bent segments;

antifriction bearing means having an axially center-bored inner race and a rotatable outer race;

said horizontally bent segments underlying said bearing means;

said vertically bent segments axially penetrating said centerbore and being fixedly attached to said inner race; and, means cooperating with said outer race for securing an animal thereto.

2. In an animal tether having plural legs and a swivel to which an animal is attachable, the improvement comprising:

first and second segments of each leg bent at right angles to a third segment thereof and extending oppositely from the latter segment;

said first segment providing elongated ground penetrating means;

said second segments being bundled together and fixed in an axial centerbore extending through said swivel; and, said third segments providing underlying support for said swivel.

3. The improved animal tether set forth in claim 2, wherein said second segments extend axially beyond said swivel and have coterminal end surfaces for receiving impact blows.

4. The improved animal tether set forth in claim 3, together with a pair of circular plates axially penetrated by said bundled second segments and being disposed relative to said swivel to capture the same axially therebetween.

* * * * *